June 12, 1928.
H. N. MILLER
1,672,899
ELECTROLYTIC CONDENSER AND ELECTROLYTE THEREFOR
Filed March 5, 1927
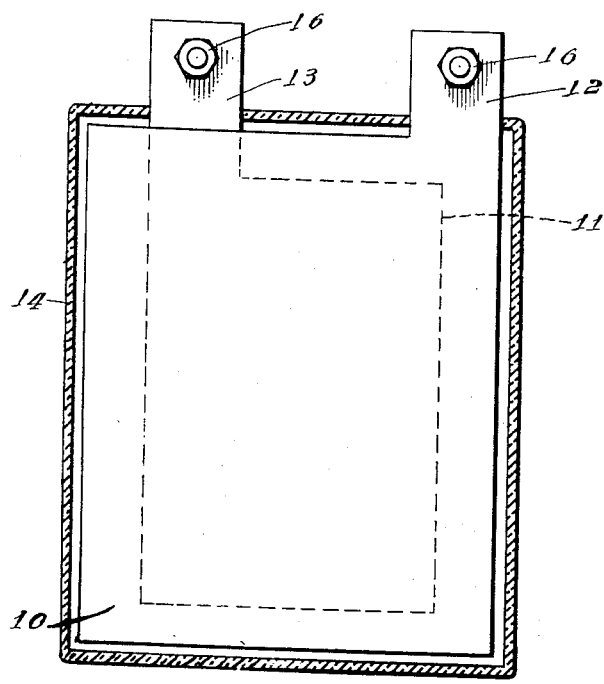
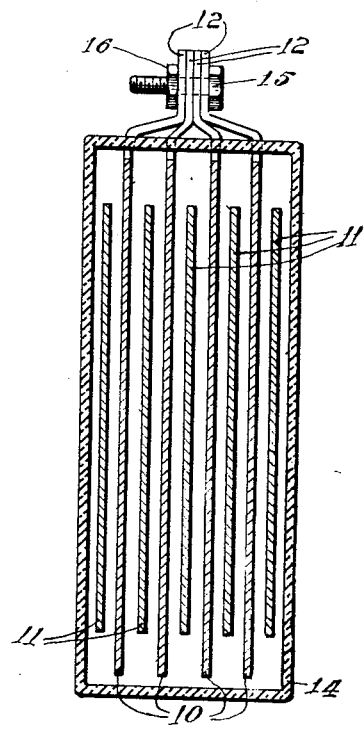
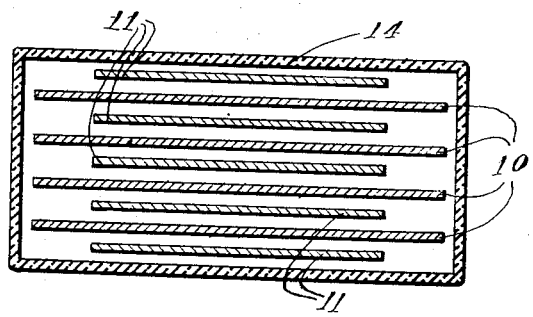
Inventor:
Harry N. Miller
By Williams, Bradbury,
McCaleb & Hinkle
Atty's Patented June 12, 1928.

1,672,899

UNITED STATES PATENT OFFICE.

HARRY N. MILLER, OF CHICAGO, ILLINOIS, ASSIGNOR TO FANSTEEL PRODUCTS COMPANY, INC., OF NORTH CHICAGO, ILLINOIS, A CORPORATION OF NEW YORK.

ELECTROLYTIC CONDENSER AND ELECTROLYTE THEREFOR.

Application filed March 5, 1927. Serial No. 173,031.

This invention relates to electrolytic apparatus, especially condensers; and the object is to provide a device of this kind which is substantially dry.

Electrolytic storage devices offer many advantages over other types of condensers in that they may be comparatively small in size and, at the same time, have a very large capacity.

Electrolytic devices heretofore used have required aqueous solutions of acids, salts, or bases which are undesirable because of the difficulty in handling and because of their corrosive action on the containers and the electrodes.

The object of my invention is to overcome these objections by providing an electrolytic conductor carried in a non-fluid gel-like body which may form a thin coating on the filmed aluminum (positive) plates and serve as negative plates of the condenser, the film on the aluminum serving as the dielectric.

A further object of this invention is to incorporate an ionogen into a composition of gelatine and glycerine.

A further object is to provide an improved condenser construction.

Other objects will be apparent as the detailed description of my invention proceeds.

The electrolyte is prepared by dissolving three parts, by weight, of gelatine in one part of glycerine, heat being supplied to effect the solution. This hot solution is preferably saturated with sodium bicarbonate, although other salts, such as neutral ammonium borate, tartrate, or phosphate, may be used without departing from the spirit of the invention. A small amount of lithium hydroxide may be added to prevent leakage and to prolong the life of the cell. This solution is allowed to cool until it acquires a consistency such that, when a plate is dipped into it, it will adhere to the depth of $\frac{1}{16}$ of an inch.

The positive or aluminum plates are cut from 26-gauge aluminum and are about 3 by 2¼ inches, with a tab projecting from one end to be connected by a binding post. These plates are first "formed" in a water solution of salt, preferably the same salt which is used in the gelatine-glycerine solution. For instance, if sodium bicarbonate is used, the plates will be immersed in a saturated solution of this salt and a direct current voltage, somewhat above the desired critical voltage of the condenser, will be impressed upon said plates until the flow of current has decreased to substantially zero. If the critical voltage is to be 100, the plates should be subjected to a voltage of about 125. The aluminum plates are then dried at room temperature and are dipped in the electrolyte solution prepared above so that this gelatine-glycerine-salt solution adheres to said plate to a depth of $\frac{1}{16}$ inch. These plates are allowed to cool till the gelatine composition is set, at which period it may be described as a tough gel, the surface of which is quite tacky.

Sheets of lead about 10 mils in thickness are cut into plates about 2½ by 1½ inches, with a tab projecting from one side to be secured by a binding post similar to the binding post used connecting the aluminum plates.

The assembly of my improved condenser is illustrated in the accompanying drawings which form a part of this specification and which similar parts are referred to by like reference characters.

Fig. 1 is a horizontal section taken on the line 1—1 of Fig. 2.

Fig. 2 is a section taken along line 2—2 of Fig. 1.

Fig. 3 is an enlarged cross section taken on line 3—3 of Fig. 2.

On a coated aluminum plate 10 is placed a lead plate 11 with the respective binding terminals 12 and 13 extending from opposite sides of a container 14, as shown in Fig. 1. In the preferred embodiment, there are about four aluminum plates and five lead plates alternately arranged, as shown in Figs. 2 and 3. The aluminum and lead plates are maintained in spaced relation by the gelatine coating 10$^A$ which adheres to said plates and serves both to keep the plates in spaced relation and to hold them together. The projections 12 of the aluminum plates are bent together and secured by a bolt 15 which forms the positive pole of the condenser. In like manner, the projections 13 of the lead plates are secured by a bolt 16. When the plates are thus secured, the entire device may be enclosed by a container of cardboard, hard rubber, or other suitable material, the binding posts 12 and 13 preferably protruding from this container, as shown in Fig. 1.

While I have described a method of coating the filmed electrodes with the electrolytic gel, it is understood that other means may be used for spacing the plates in my condenser. For example, the gelatine-glycerine-salt solution prepared as above indicated, may be flowed on a glass plate to a depth of about 1/16 inch, and when cooled, may be cut into squares of proper size for use with the condenser plates. When these films of electrolyte are used, the condenser is made by placing them between the alternate aluminum and lead plates, the adhesive properties of the gel hold the assembled mass together and the toughness and rigidity of the gel maintain the plates in spaced relation.

Another embodiment of my invention would consist in passing a strip of thin paper, cloth, or the like, through the gelatine-glycerine-salt solution in the manner generally used to coat rubber goods or to deposit sensitizing medium on photographic films. Various systems of rollers, tanks, heating means, etc., may be employed. These means are familiar and need no description here as they do not form a part of the present invention. The coated films thus produced are cooled until they become of a tough gel-like, tacky consistency, at which time they are cut into squares and placed between the condenser plates, as in the above example.

While in my preferred embodiment I have used plates of aluminum as a film forming metal, it is understood that any valve metal may be used, especially tantalum whose film forming qualities render it especially adaptable for this purpose. Likewise, I do not limit myself to lead plates. These plates are merely for the purpose of conducting the electricity to the various parts of the electrolyte and any good conductor, which does not form a film, and which is not corroded, may be used.

My invention also includes the use of film forming electrotrodes instead of lead plates; for example, all of the plates (both 10 and 11) may be made of aluminum or of tantalum. For a condenser connected in series in an alternating circuit, this type of a condenser would be used.

In describing the operation of my condenser, it need only be pointed out that the lead plates do not serve as condenser plates as such, but merely as conductors to evenly distribute the electrical charge to the various parts of the electrolyte. The electrolyte gel, which may be called an electrolytic conductor, is in reality the negative plate of my condenser, the film on the aluminum is the dielectric, and the aluminum is the positive plate. It will thus be seen that I have combined the advantages of the electrolytic condenser and of the ordinary condenser in a single device.

The term "ionogen" as used in the accompanying claims is a generic expression which includes acids, bases, salts, and/or other materials which, in solution and/or fluid condition, yield ions to conduct an electric current. An electrolyte is an ionogen solution.

The term "dry" as used in the accompanying claims does not means that no trace of water can be present but that the reagents are kept as free from water as practicable using ordinary C. P. glycerin.

While I have described in detail a preferred embodiment of my invention, it is understood that I do not limit myself to the specific details shown except as defined by the following claims.

I claim:

1. In an electrolytic device, an ionogen incorporated in a composition of gelatine and glycerine.

2. In an electrolytic device, an ionogen incorporated in a gel prepared by dissolving three parts by weight of gelatine and one part by weight of glycerine.

3. An electrolytic condenser, comprising filmed and conductive metal plates and a substantially dry gelatin glycerin conductor between said plates.

4. A dry, electrolytic condenser, comprising a series of aluminum plates joined to one terminal, a series of conductive plates joined to another terminal, and a conductive gelatin glycerin composition between said aluminum and said conductive plates.

5. A dry electrolyte including glycerine and sodium bicarbonate.

6. An electrolyte comprising gelatine, glycerine and sodium bicarbonate.

7. A condenser comprising filmed aluminum plates and conductive plates held in intimately disposed spaced relation by a dry gelatine-glycerine composition containing sodium bicarbonate.

8. In an electrolytic device, a filmed electrode, and a dry electrolyte including glycerine and sodium bicarbonate.

9. In an electrolytic device, a filmed electrode, and an electrolyte comprising gelatine, glycerine and sodium bicarbonate.

10. In an electrolytic device, a filmed electrode, and an electrolyte comprising an ionogen incorporated in a composition of gelatine and glycerine.

In witness whereof, I hereunto subscribe my name this 3 day of March, 1927.

HARRY N. MILLER.